United States Patent
Eastwood et al.

(10) Patent No.: US 10,670,269 B2
(45) Date of Patent: Jun. 2, 2020

(54) CAST COMBUSTOR LINER PANEL GATING FEATURE FOR A GAS TURBINE ENGINE COMBUSTOR

(71) Applicant: United Technologies Corporation, Farmington, CT (US)

(72) Inventors: Jonathan Jeffery Eastwood, West Hartford, CT (US); Kevin Zacchera, Glastonbury, CT (US); Brian T. Hazel, Avon, CT (US); William F. Werkheiser, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 897 days.

(21) Appl. No.: 15/334,860

(22) Filed: Oct. 26, 2016

(65) Prior Publication Data

US 2018/0112876 A1 Apr. 26, 2018

(51) Int. Cl.
| | |
|---|---|
| F02C 7/20 | (2006.01) |
| F23R 3/00 | (2006.01) |
| F23R 3/06 | (2006.01) |
| F23R 3/60 | (2006.01) |

(52) U.S. Cl.
CPC ............... *F23R 3/002* (2013.01); *F23R 3/06* (2013.01); *F23R 3/60* (2013.01); *F23R 2900/00018* (2013.01); *F23R 2900/03044* (2013.01); *Y02T 50/675* (2013.01); *Y02T 50/6765* (2018.05)

(58) Field of Classification Search
CPC ............ F23R 3/002; F23R 2900/00018; B23P 15/008; B23P 2700/13
See application file for complete search history.

(56) References Cited

U.S. PATENT DOCUMENTS

| | | | | |
|---|---|---|---|---|
| 4,345,953 | A | * 8/1982 | Kaneko ................ | C22C 21/10 420/541 |
| 4,653,279 | A | * 3/1987 | Reynolds ............. | F23R 3/06 60/755 |
| 5,000,005 | A | * 3/1991 | Kwan .................. | F01D 5/184 431/352 |
| 5,130,163 | A | 7/1992 | Clingman et al. | |
| 5,147,587 | A | * 9/1992 | Marcus ................ | B33Y 10/00 264/434 |

(Continued)

FOREIGN PATENT DOCUMENTS

EP 3150802 A1 4/2017

OTHER PUBLICATIONS

European Search Report dated Jun. 11, 2018 for corresponding European Patent Application No. 17198179.8.

*Primary Examiner* — Gerald L Sung
(74) *Attorney, Agent, or Firm* — Bachman & LaPointe, P.C.

(57) ABSTRACT

A liner panel for use in a combustor of a gas turbine engine, the liner panel includes a radiused gate blended into a hot side of the liner panel. A combustor for a gas turbine engine including a liner panel mounted to a support shell via a multiple of studs, the liner panel including a radiused gate blended into a hot side of the liner panel, the hot side including a thermal barrier coating. A method of manufacturing including casting a radiused gate tangentially cast into a hot side of a liner panel; and applying a thermal barrier coating to the hot side of the liner panel over the remnant of the radiused gate.

14 Claims, 8 Drawing Sheets

(56) References Cited

U.S. PATENT DOCUMENTS

| | | | |
|---|---|---|---|
| 5,435,139 A * | 7/1995 | Pidcock | F23R 3/002 |
| | | | 60/752 |
| 5,758,503 A | 6/1998 | DuBell et al. | |
| 5,775,108 A | 7/1998 | Ansart et al. | |
| 5,775,589 A | 7/1998 | Vdoviak et al. | |
| 6,087,023 A * | 7/2000 | Tsantrizos | C23C 4/185 |
| | | | 428/612 |
| 6,096,381 A * | 8/2000 | Zheng | C23C 4/02 |
| | | | 427/454 |
| 6,186,072 B1 * | 2/2001 | Hickerson, Jr. | F42B 12/06 |
| | | | 102/517 |
| 6,282,905 B1 | 9/2001 | Sato et al. | |
| 8,113,004 B2 | 2/2012 | Carlisle et al. | |
| 8,256,224 B2 | 9/2012 | Garry et al. | |
| 8,266,914 B2 | 9/2012 | Hawie et al. | |
| 8,359,865 B2 | 1/2013 | Dierberger et al. | |
| 8,359,866 B2 | 1/2013 | Dierberger et al. | |
| 8,393,155 B2 | 3/2013 | Piper et al. | |
| 8,408,010 B2 | 4/2013 | Garry et al. | |
| 2002/0116929 A1 | 8/2002 | Snyder | |
| 2002/0184892 A1 | 12/2002 | Calvez et al. | |
| 2007/0130953 A1 | 6/2007 | Burd et al. | |
| 2007/0144178 A1 | 6/2007 | Burd et al. | |
| 2007/0186558 A1 | 8/2007 | De Sousa et al. | |
| 2007/0186559 A1 | 8/2007 | De Sousa et al. | |
| 2013/0160967 A1 * | 6/2013 | Suzuki | B22D 27/04 |
| | | | 164/493 |
| 2015/0202702 A1 * | 7/2015 | Rizzo | B23H 3/00 |
| | | | 205/662 |
| 2016/0265775 A1 | 9/2016 | Cunha et al. | |
| 2017/0089578 A1 | 3/2017 | Bunker et al. | |

* cited by examiner

CAST COMBUSTOR LINER PANEL GATING FEATURE FOR A GAS TURBINE ENGINE COMBUSTOR

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, relatively high temperatures are observed in the combustor section such that cooling airflow is provided to meet desired service life requirements. The combustor section typically includes a combustion chamber formed by an inner and outer wall assembly. Each wall assembly includes a support shell lined with heat shields often referred to as liner panels.

In typical combustor chamber designs, combustor Impingement Film-Cooled Floatwall (IFF) liner panels are typically a curved flat surface on a hot side exposed to the gas path. The opposite, or cold side, has features such as cast in threaded studs to mount the liner panel and a full perimeter rail that contact the inner surface of the liner shells.

The liner panels are typically cast as part of the casting process the vendor will add gating tabs to the hot surface of the part, which is used during the manufacturing process to feed the molten metal to various portions of the segment. During the casting process these gates are mechanically removed before delivery of the finished part. This is typically done by manual grinding, which may leave some evidence of the gating. This may result in durability issues.

SUMMARY

A liner panel for use in a combustor of a gas turbine engine, the liner panel according to one disclosed non-limiting embodiment of the present disclosure can include a radiused gate cast into a hot side of the liner panel.

A further embodiment of the present disclosure may include, wherein the radiused gate includes a tangency adjacent to the hot side.

A further embodiment of the present disclosure may include, wherein the radiused gate is defined over an about 0.028 inches (0.71 mm) length over a 0.01 inch (0.25 mm) height.

A further embodiment of the present disclosure may include, wherein the radiused gate defines a radius length-height ratio of about 3:1.

A further embodiment of the present disclosure may include a coating on the hot side over remnant of the radiused gates.

A further embodiment of the present disclosure may include, wherein the coating is a thermal barrier coating.

A further embodiment of the present disclosure may include, wherein the thermal barrier coating includes a bond coat and a top coat.

A further embodiment of the present disclosure may include, wherein the radiused gate is cast concurrent with the liner pane.

A further embodiment of the present disclosure may include, wherein the radiused gate is located adjacent a dilution hole of the liner panel A combustor for a gas turbine engine according to one disclosed non-limiting embodiment of the present disclosure can include a support shell; and a liner panel mounted to the support shell via a multiple of studs, the liner panel including remnant of a radiused gate in a hot side of the liner panel, the hot side including a thermal barrier coating over the remnant of the radiused gate.

A further embodiment of the present disclosure may include a forward assembly including a bulkhead support shell, a bulkhead assembly mounted to the bulkhead support shell, and a multiple of the combustor swirlers mounted at least partially through the bulkhead assembly.

A further embodiment of the present disclosure may include, wherein the forward assembly is mounted to the support shell.

A further embodiment of the present disclosure may include a multiple of circumferentially distributed bulkhead liner panels secured to the bulkhead support shell around a swirler opening.

A further embodiment of the present disclosure may include, wherein the radiused gate includes a tangency to the hot side.

A further embodiment of the present disclosure may include, wherein the radiused gate is defined over an about 0.028 inches (0.71 mm) length over a 0.01 inch (0.25 mm) height.

A further embodiment of the present disclosure may include, wherein the radiused gate defines a radius length to height ratio of about 3:1.

A method of manufacturing according to one disclosed non-limiting embodiment of the present disclosure can include casting a radiused gate into a hot side of a liner panel; blending the radiused gate into the hot side leaving a remnant of the radiused gate; and applying a thermal barrier coating to the hot side of the liner panel over the remnant of the radiused gate.

A further embodiment of the present disclosure may include casting the radiused gate with a tangency to the hot side.

A further embodiment of the present disclosure may include applying the thermal barrier coating as a bond coat and a top coat.

A further embodiment of the present disclosure may include casting the radiused gate with a radius length to height ratio of about 3:1.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
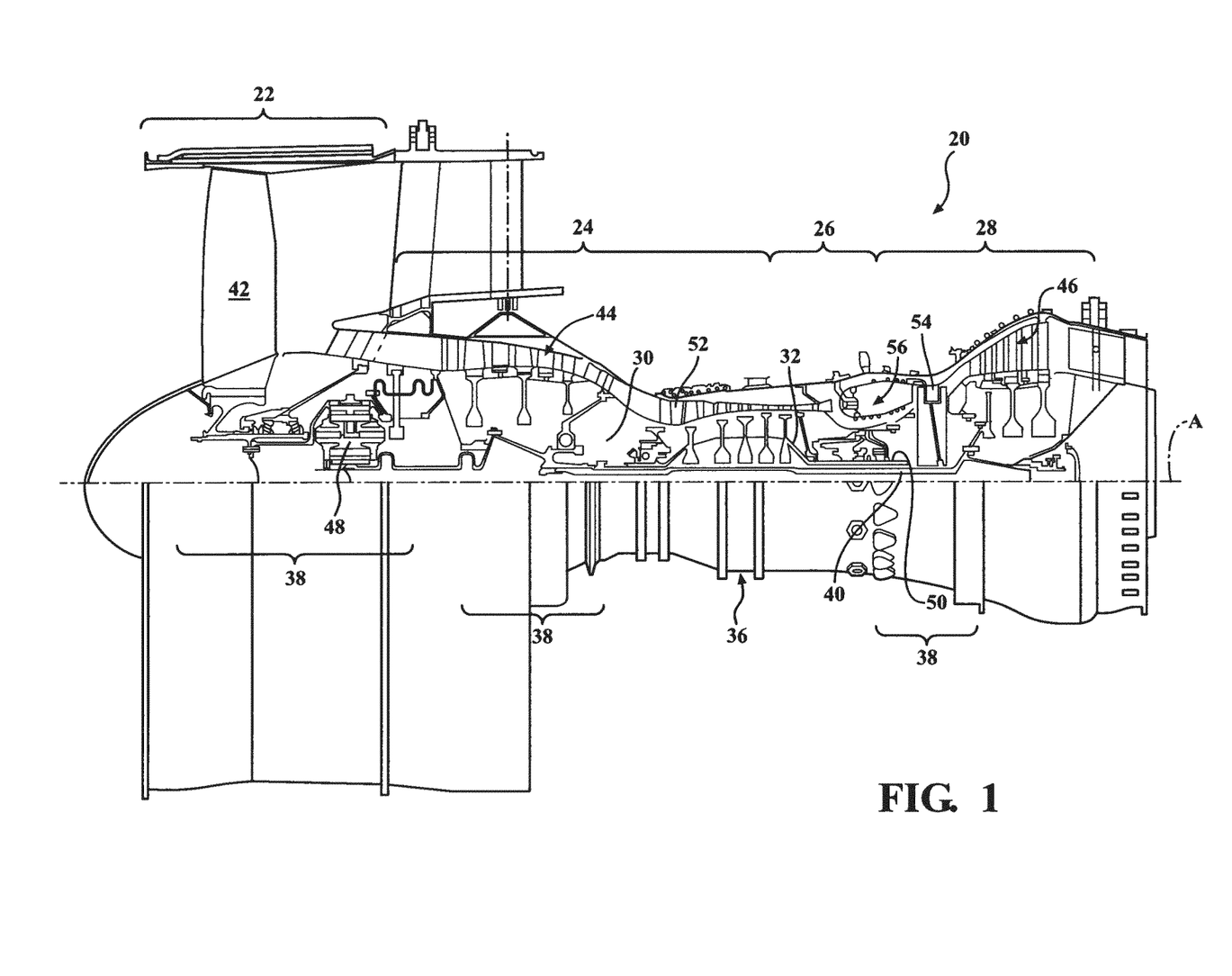
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section among other systems or features. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be appreciated that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44, then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by bearing systems 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be appreciated, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet (10668 m). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 2:
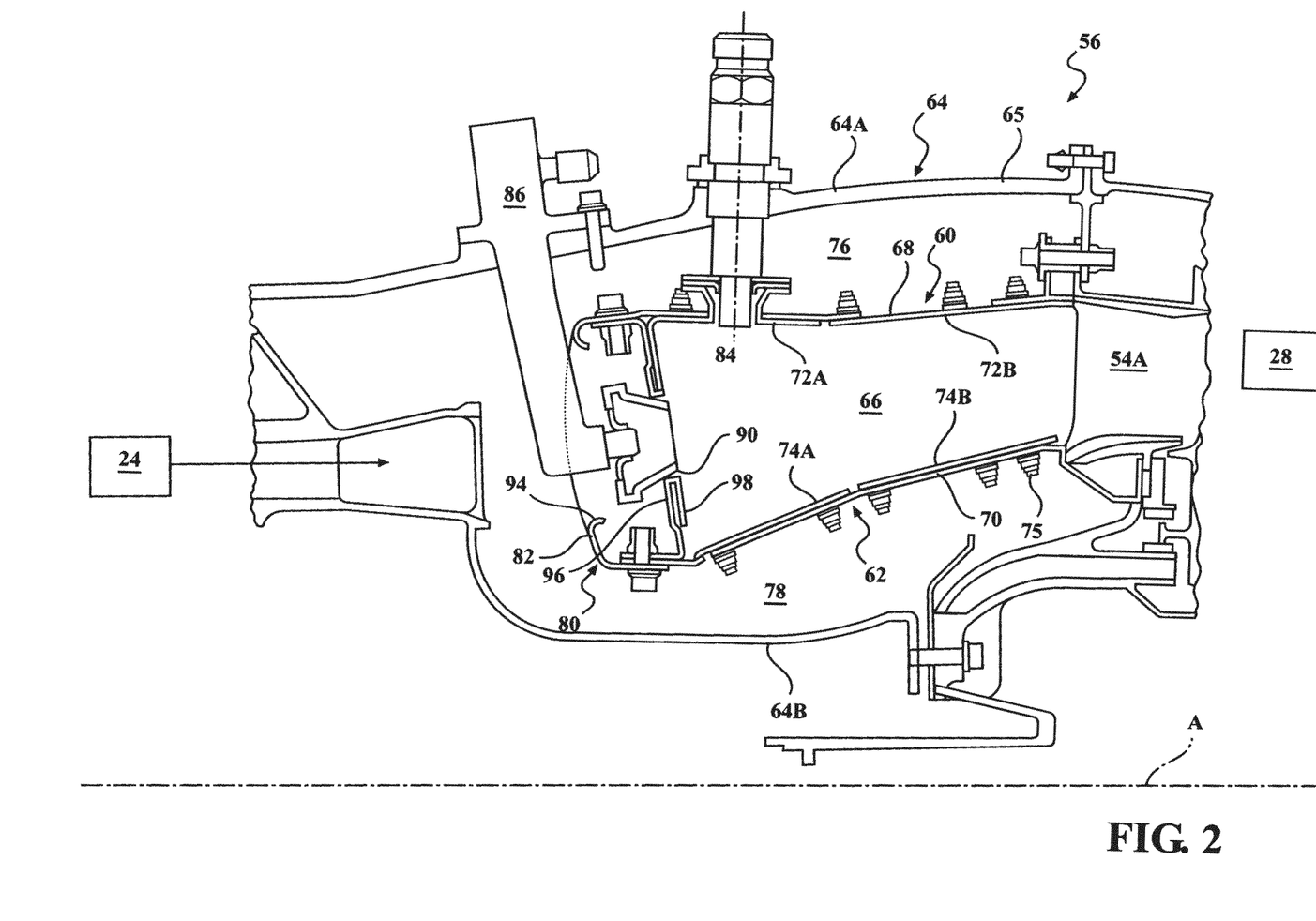
FIG. 2 is an expanded longitudinal schematic sectional view of a combustor section according to one non-limiting embodiment that may be used with the example gas turbine engine architectures.

With reference to FIG. 2, the combustor section 26 generally includes a combustor 56 with an outer combustor wall assembly 60, an inner combustor wall assembly 62, and a diffuser case module 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be appreciated that although a particular combustor is illustrated, other combustor types with various combustor liner arrangements will also benefit herefrom. It should be further appreciated that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto arranged to form a liner array. The support shells 68, 70 may be manufactured by, for example, the hydroforming of a sheet metal alloy to provide the generally cylindrical outer shell 68 and inner shell 70. Each of the liner panels 72, 74 may be generally rectilinear with a circumferential arc. The liner panels 72, 74 may be manufactured of, for example, a nickel based super alloy, ceramic or other temperature resistant material. In one disclosed non-limiting embodiment, the liner array includes a multiple of forward liner panels 72A and a multiple of aft liner panels 72B that are circumferentially staggered to line the outer shell 68. A multiple of forward liner panels 74A and a multiple of aft liner panels 74B are circumferentially staggered to line the inner shell 70.

The combustor 56 further includes a forward assembly 80 immediately downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84.

The bulkhead assembly 84 includes a bulkhead support shell 96 secured to the combustor walls 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forwardmost ends of the combustor walls 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 and through the swirler opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
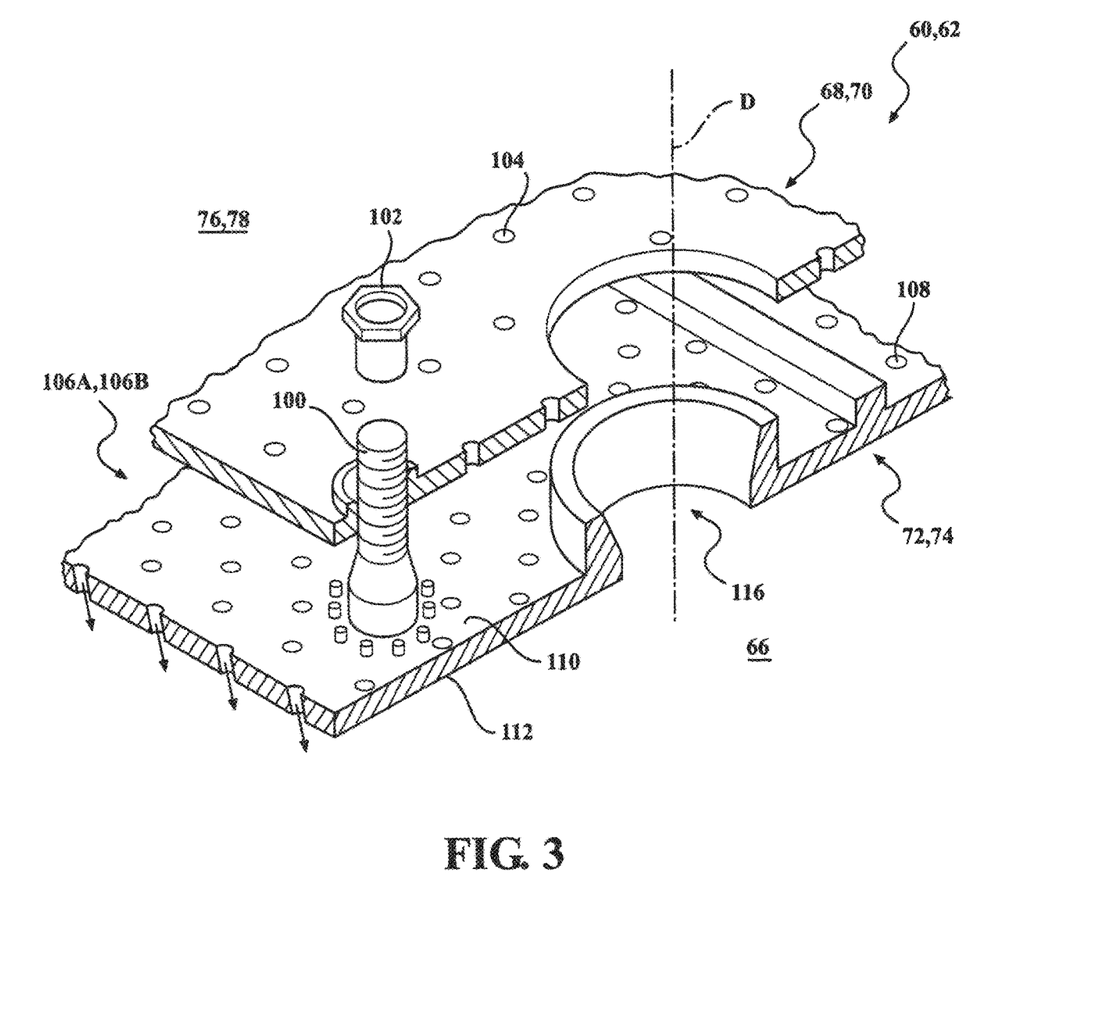
FIG. 3 is an exploded partial sectional view of a portion of a combustor wall assembly.

With reference to FIG. 3, a multiple of studs 100 extend from each of the liner panels 72, 74 so as to permit a liner array (partially shown in FIG. 4) of the liner panels 72, 74 to be mounted to their respective support shells 68, 70 with fasteners 102 such as nuts. That is, the studs 100 project rigidly from the liner panels 72, 74 to extend through the respective support shells 68, 70 and receive the fasteners 102 on a threaded section thereof (FIG. 5).

A multiple of cooling impingement passages 104 penetrate through the support shells 68, 70 to allow air from the respective annular plenums 76, 78 to enter cavities 106 formed in the combustor walls 60, 62 between the respective support shells 68, 70 and liner panels 72, 74. The impingement passages 104 are generally normal to the surface of the liner panels 72, 74. The air in the cavities 106 provides cold side impingement cooling of the liner panels 72, 74 that is generally defined herein as heat removal via internal convection.

A multiple of effusion passages 108 penetrate through each of the liner panels 72, 74. The geometry of the passages, e.g., diameter, shape, density, surface angle, incidence angle, etc., as well as the location of the passages with respect to the high temperature combustion flow also contributes to effusion cooling. The effusion passages 108 allow the air to pass from the cavities 106 defined in part by a cold side 110 of the liner panels 72, 74 to a hot side 112 of the liner panels 72, 74 and thereby facilitate the formation of a thin, relatively cool, film of cooling air along the hot side 112.

Figure 6:
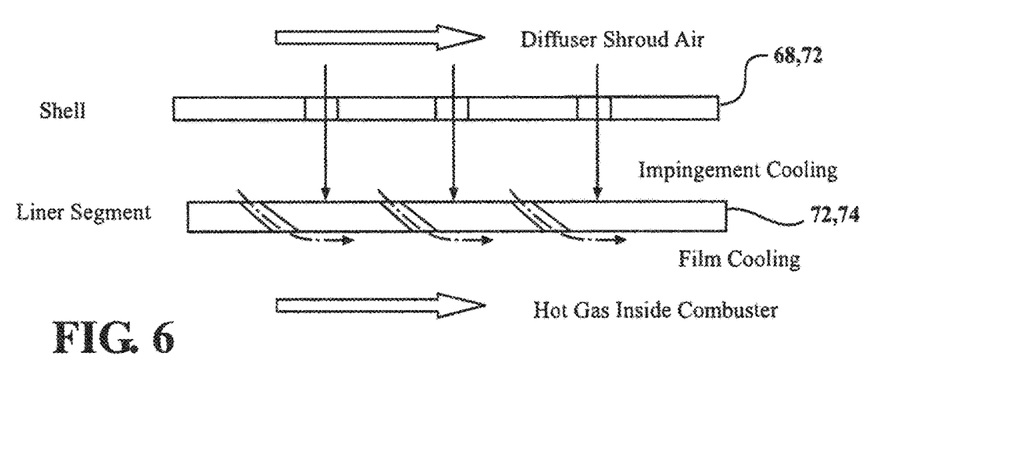
FIG. 6 is a sectional view of a portion of a combustor wall assembly.

In one disclosed non-limiting embodiment, each of the multiple of effusion passages 108 are typically 0.025" (0.635 mm) in diameter and define a surface angle of about thirty (30) degrees with respect to the cold side 110 of the liner panels 72, 74. The effusion passages 108 are generally more numerous than the impingement passages 104 and promote film cooling along the hot side 112 to sheath the liner panels 72, 74 (FIG. 6). Film cooling as defined herein is the introduction of a relatively cooler air at one or more discrete locations along a surface exposed to a high temperature environment to protect that surface in the region of the air injection as well as downstream thereof.

The combination of impingement passages 104 and effusion passages 108 may be referred to as an Impingement Film Floatwall (IFF) assembly. A multiple of dilution passages 116 are located in the liner panels 72, 74 each along a common axis D. For example only, the dilution passages 116 are located in a circumferential line W (shown partially in FIG. 4). Although the dilution passages 116 are illustrated in the disclosed non-limiting embodiment as within the aft liner panels 72B, 74B, the dilution passages may alternatively be located in the forward liner panels 72A, 72B or in a single liner panel which replaces the fore/aft liner panel array. Further, the dilution passages 116 although illustrated in the disclosed non-limiting embodiment as integrally formed in the liner panels, it should be appreciated that the dilution passages 116 may be separate components. Whether integrally formed or separate components, the dilution passages 116 may be referred to as grommets.

Figure 4:
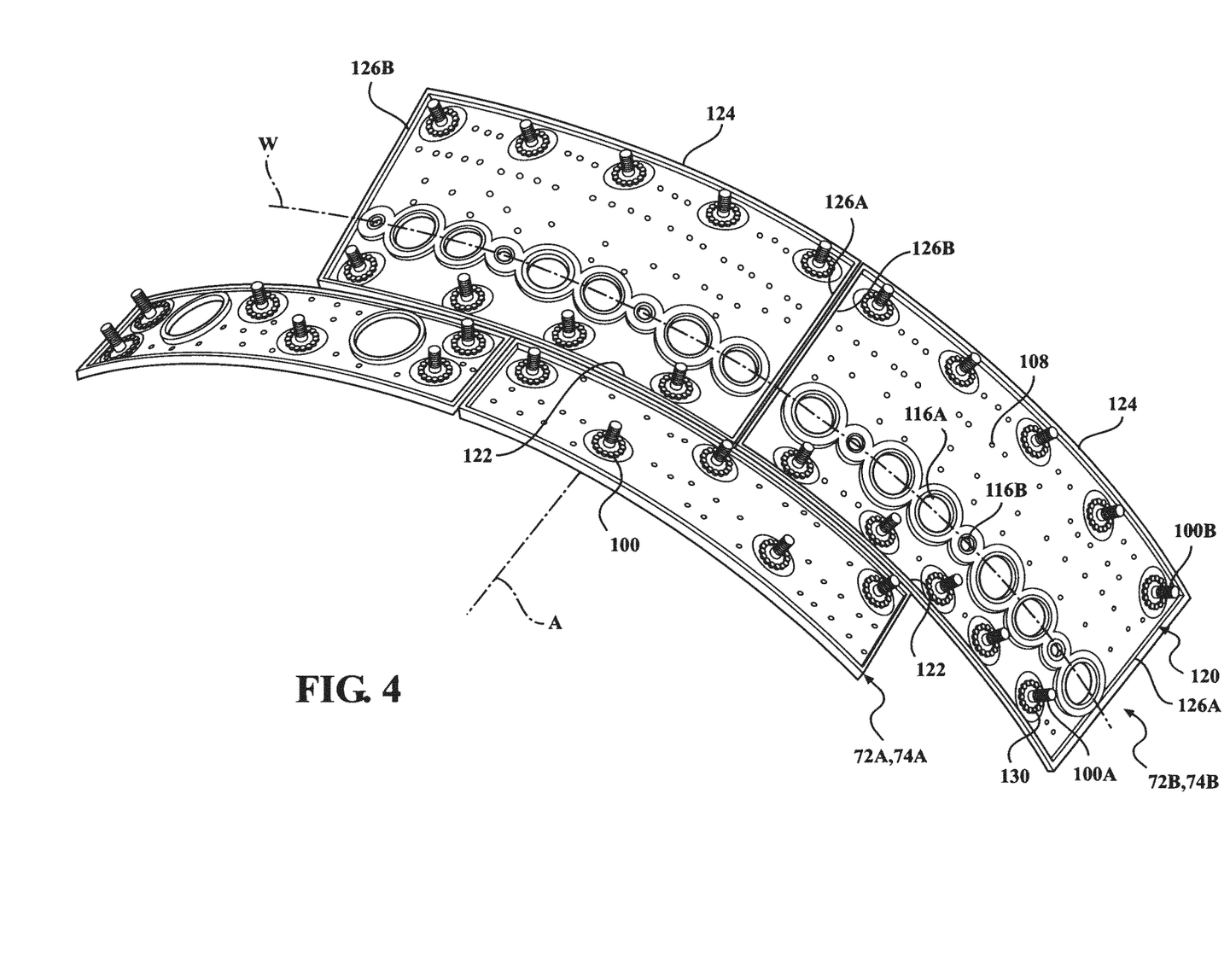
FIG. 4 is a perspective cold side view of a portion of a liner panel array.
Figure 5:
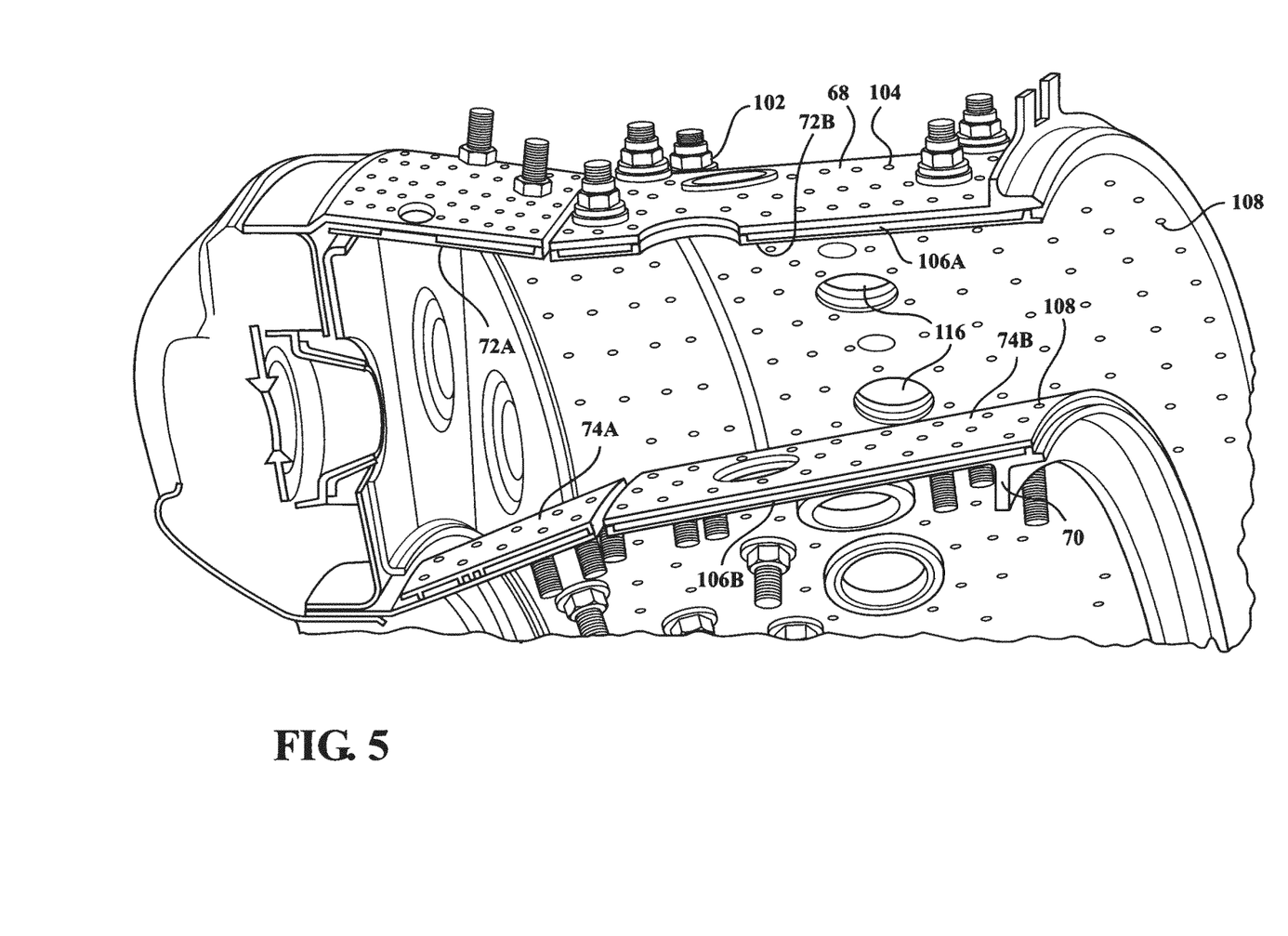
FIG. 5 is a perspective partial sectional view of a combustor.

With reference to FIG. 4, in one disclosed non-limiting embodiment, each of the liner panels 72A, 72B, 74A, 74B in the liner panel array includes a perimeter rail 120 formed by a forward circumferential rail 122, an aft circumferential rail 124, and axial rails 126A, 126B, that interconnect the forward and aft circumferential rail 122, 124. The perimeter rail 120 seals each liner panel with respect to the respective support shell 68, 70 to form the impingement cavity 106 therebetween. That is, the forward and aft circumferential rail 122, 124 are located at relatively constant curvature shell interfaces while the axial rails 126 extend across an axial length of the respective support shell 68, 70 to complete the perimeter rail 120 that seals the liner panels 72, 74 to the respective support shell 68, 70.

A multiple of studs 100 are located adjacent to the respective forward circumferential rail 122 and the aft circumferential rail 124. Each of the studs 100 may be at least partially surrounded by posts 130 to at least partially support the fastener 102 and provide a stand-off between each liner panels 72B, 74B and respective support shell 68, 70.

The dilution passages 116 are located downstream of the forward circumferential rail 122 in the aft liner panels 72B, 74B to quench the hot combustion gases within the combustion chamber 66 by direct supply of cooling air from the respective annular plenums 76, 78. That is, the dilution passages 116 pass air at the pressure outside the combustion chamber 66 directly into the combustion chamber 66.

This dilution air is not primarily used for cooling of the metal surfaces of the combustor shells or panels, but to condition the combustion products within the combustion chamber 66. In this disclosed non-limiting embodiment, the dilution passages 116 includes at least one set of circumferentially alternating major dilution passages 116A and minor dilution passages 116B (also shown in FIG. 6). That is, in some circumferentially offset locations, two major dilution passages 116A are separated by one minor dilution passages 116B. Here, every two major dilution passages 116A are separated by one minor dilution passages 116B but may still be considered "circumferentially alternating" as described herein.

Figure 7:
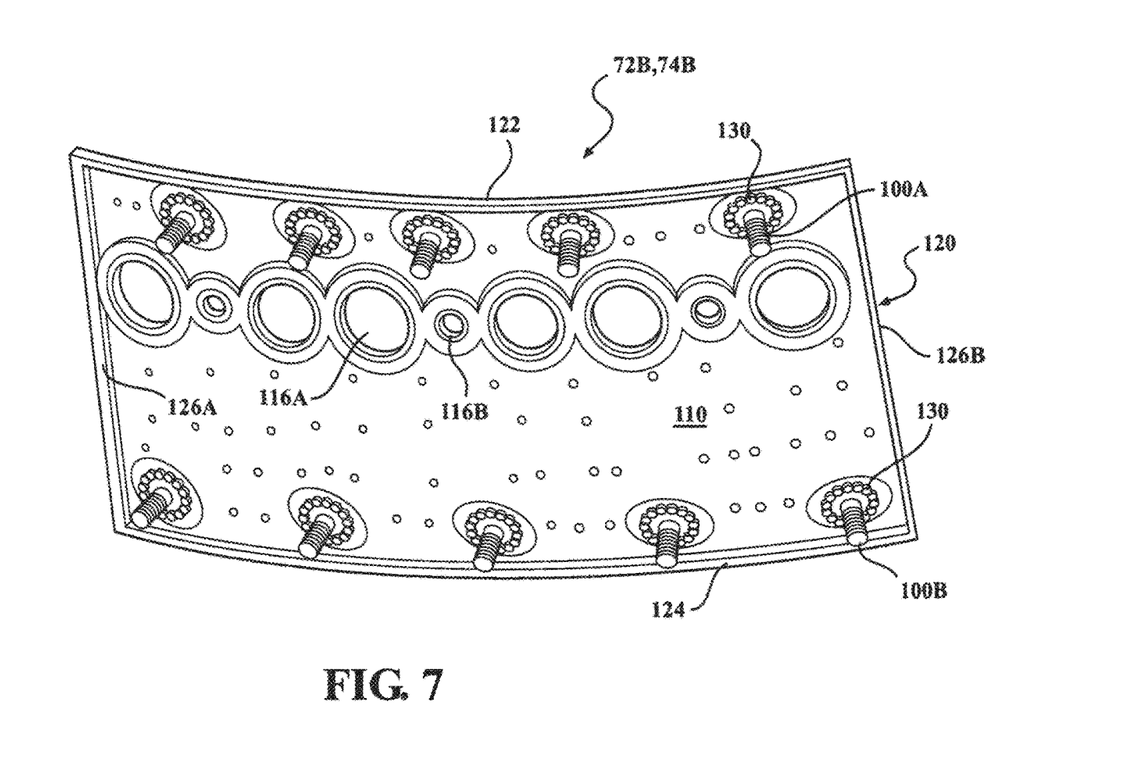
FIG. 7 is a perspective view of a liner panel cold side.
Figure 8:
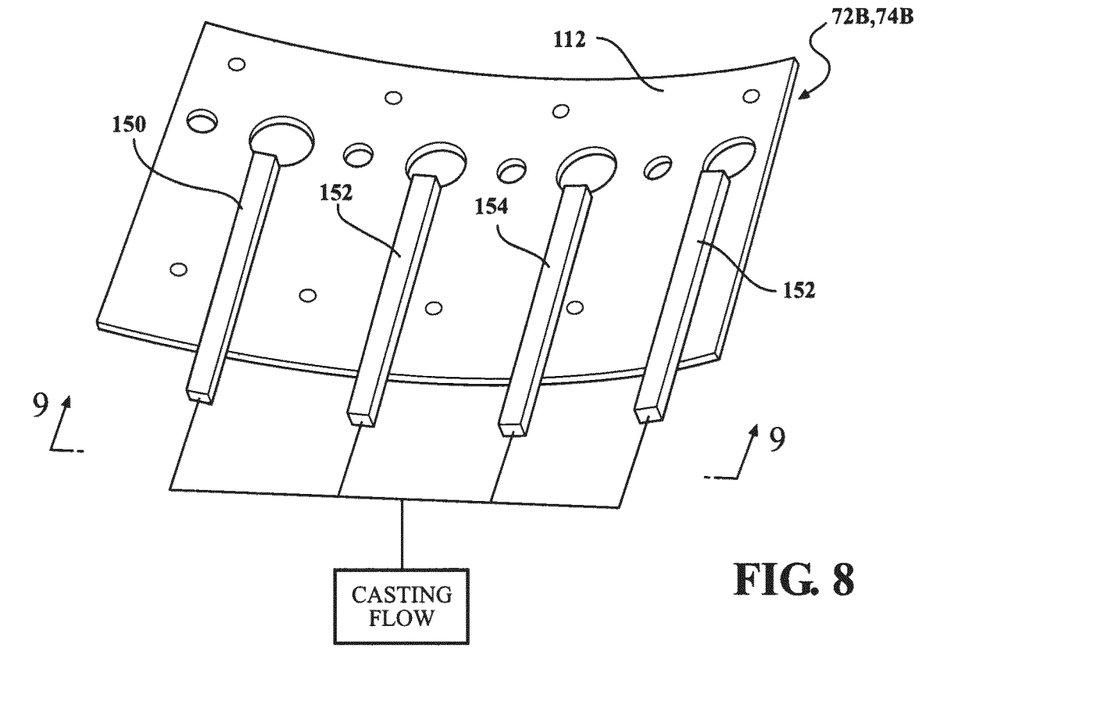
FIG. 8 is a perspective view of an example aft liner panel hot side with casting gates schematically illustrated.
Figure 9:
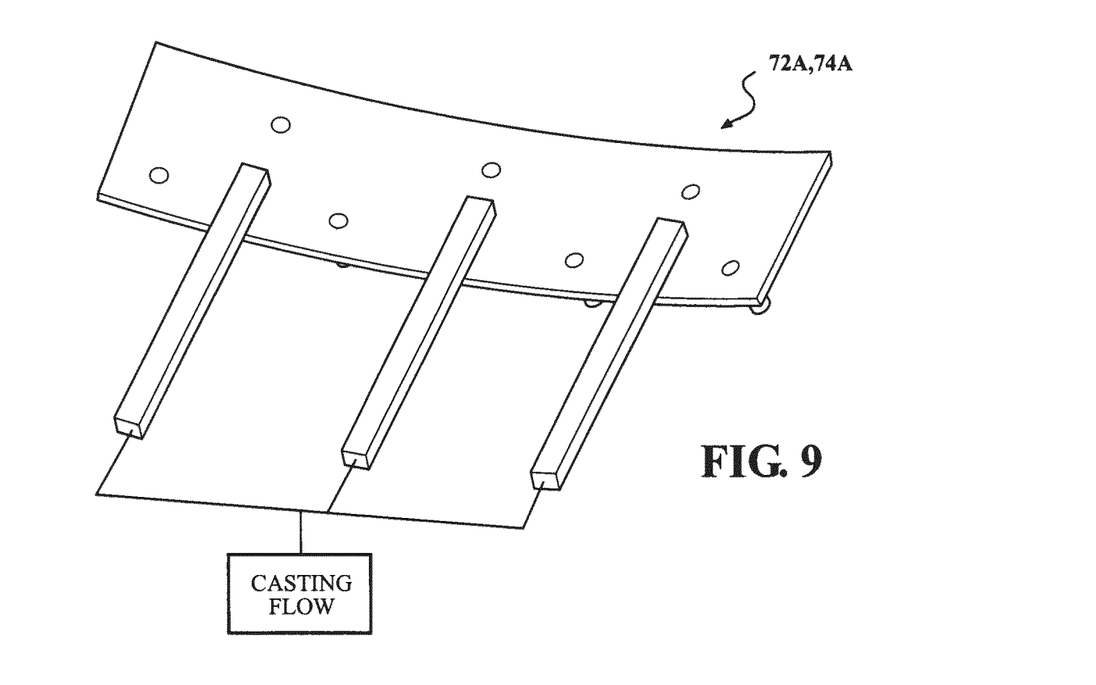
FIG. 9 is a perspective view of an example forward liner panel hot side with casting gates schematically illustrated.
Figure 10:
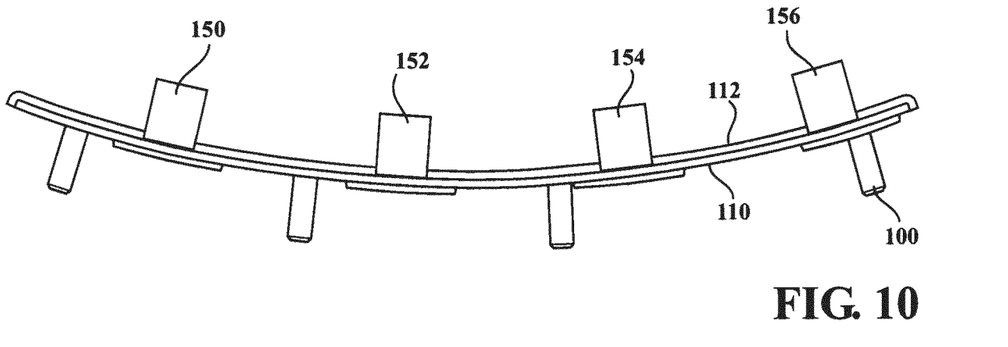
FIG. 10 is an end view of the liner panel with casting gates schematically illustrated.

With reference to FIG. 7, a single example aft liner panel with dilution passages 116A, 116B is illustrated, however, each, or particular, liner panels may benefit herefrom such as an aft liner panel with dilution passages 116A, 116B (FIG. 8) and/or a forward liner panel without dilution passages 116A, 116B (FIG. 9). In order to manufacture the liner segments, typically by an investment casting method, several casting gates 150, 152, 154 and 156 are formed to extend from a surface of the panel (FIG. 10). In the disclose embodiment, the radiused gates 150, 152, 154, 156 are placed on the hot surface of the segment which is exposed to the gas path but they may also be placed on the cold side or the edges of the segment.

Figure 11:
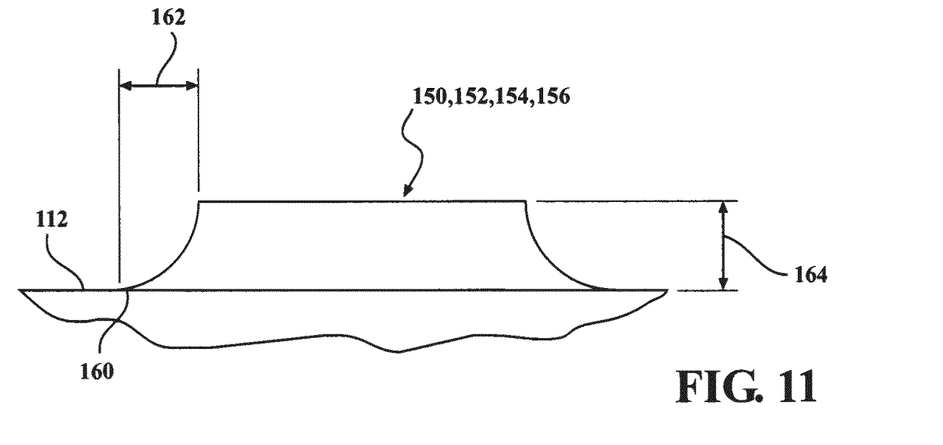
FIG. 11 is an expanded view of a radiused casting gate according to one disclosed non-limiting embodiment.

With reference to FIG. 11, the radiused gates 150, 152, 154, 156 generally include a passage wall 152 and a flange wall 154 that extends transversely therefrom. It should be appreciated that the radiused gates 150, 152, 154, 156 may be of various configurations and numbers and the illustrated embodiment is merely illustrative.

The radiused gates 150, 152, 154, 156 blend into the associated surface such as the hot side 112 at a respective tangency 160. The tangency 160 facilitates application of a coating once the majority of the radiused gates 150, 152, 154, 156 are removed and only a remnant remains.

In order to make the transition between the hot surface of the panel and the remnant of the gating a radius, which is tangent to the hot surface 112 over a minimum length dimension, is used to define the radiused gates 150, 152, 154, 156. In one embodiment, the minimum length is defined over an about 0.028 inches (0.71 mm) length 162 with respect to a 0.01 inch (0.25 mm) height 164 radiused gates 150, 152, 154, 156. In this embodiment, this defines a radius length—height ratio of about 3:1. The tangency of the radiused gates 150, 152, 154, 156 facilitates adhesion of a protective coating to thereby improve durability.

Figure 12:
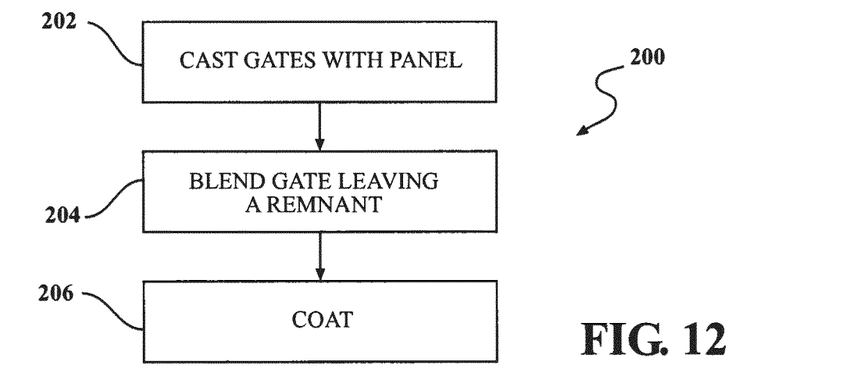
FIG. 12 is a flowchart illustrating a casting method according to one disclosed non-limiting embodiment.

With reference to FIG. 12, in one method of manufacture 200, the radiused gates 150, 152, 154, 156 are first cast concurrent with casting of the liner panel (step 202). Next, the radiused gates 150, 152, 154, 156 are blending into the hot side 112 leaving a remnant of the radiused gate (step 204). Finally, a coating is applied to the hot side of the liner panel over the remnant of the radiused gate (step 206).

The radiused gates 150, 152, 154, 156, facilitates application of the coating that increases the oxidation life. That is, the hot side 112 of each liner panel of the liner panel array may be coated to provide thermal barrier, environmental barrier, and/or other capabilities required to survive in a high-temperature environment. The coating may be a thermal barrier coating (TBC) that includes a bond coat and a top coat. The bond coat, in one non-limiting example, may be a nickel-based alloy material, while the top coat may be a ceramic material that is applied via a plasma or other spray coating system. In some non-limiting embodiments, the top coat may be thicker than the bond coat. As the coating is a ceramic mix it is common to have chipping at area of the part, which have sharp edges. The radiused gates 150, 152, 154, 156, significantly reduce the chance of chipping.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A liner panel for use in a combustor of a gas turbine engine, the liner panel comprising:
   a remnant of a radiused gate cast into a hot side of the liner panel, wherein the remnant of the radiused gate defines a radius length—height ratio of 3:1; and
   a coating on the hot side and over the remnant of the radiused gate.

2. The liner panel as recited in claim 1, wherein the remnant of the radiused gate includes a tangency adjacent to the hot side.

3. The liner panel as recited in claim 1, wherein the remnant of the radiused gate is defined over a 0.028 inch (0.71 mm) length over a 0.01 inch (0.25 mm) height.

4. The liner panel as recited in claim 1, wherein the coating is a thermal barrier coating.

5. The liner panel as recited in claim 4, wherein the thermal barrier coating includes a bond coat and a top coat.

6. The liner panel as recited in claim 1, wherein a gate is cast concurrent with the liner panel, then blended to form the remnant of the radiused gate.

7. The liner panel as recited in claim 6, wherein the remnant of the radiused gate extends from a dilution hole of the liner panel.

8. The liner panel as recited in claim 1, wherein a gate is cast into the hot side of the liner panel by an investment casting method then blended to form the remnant of the radiused gate.

9. A combustor for a gas turbine engine comprising:
a support shell; and
a liner panel mounted to the support shell via a multiple of studs that extend from a cold side of the liner panel, the liner panel comprising a remnant of a radiused gate blended into a hot side of the liner panel, the remnant of a radiused gate extends linearly from a dilution hole along the hot side and defines a tangency to the hot side with a radius length to height ratio of 3:1; and
a thermal barrier coating on the hot side and over the remnant of the radiused gate.

10. The combustor as recited in claim 9, further comprising:
a forward assembly including a bulkhead support shell, a bulkhead assembly mounted to the bulkhead support shell, and a multiple of combustor swirlers mounted at least partially through the bulkhead assembly.

11. The combustor as recited in claim 10, wherein the forward assembly is mounted to the support shell.

12. The combustor as recited in claim 11, further comprising a multiple of circumferentially distributed bulkhead liner panels secured to the bulkhead support shell around a swirler opening.

13. The combustor as recited in claim 10, wherein the remnant of the radiused gate includes a tangency to the hot side.

14. The combustor as recited in claim 13, wherein the remnant of the radiused gate is defined over a 0.028 inch (0.71 mm) length over a 0.01 inch (0.25 mm) height.

\* \* \* \* \*